No. 606,839.  
G. W. HOUSEL.  
MATCH BOX.  
(Application filed Aug. 23, 1897.)
Patented July 5, 1898.
(No Model.)
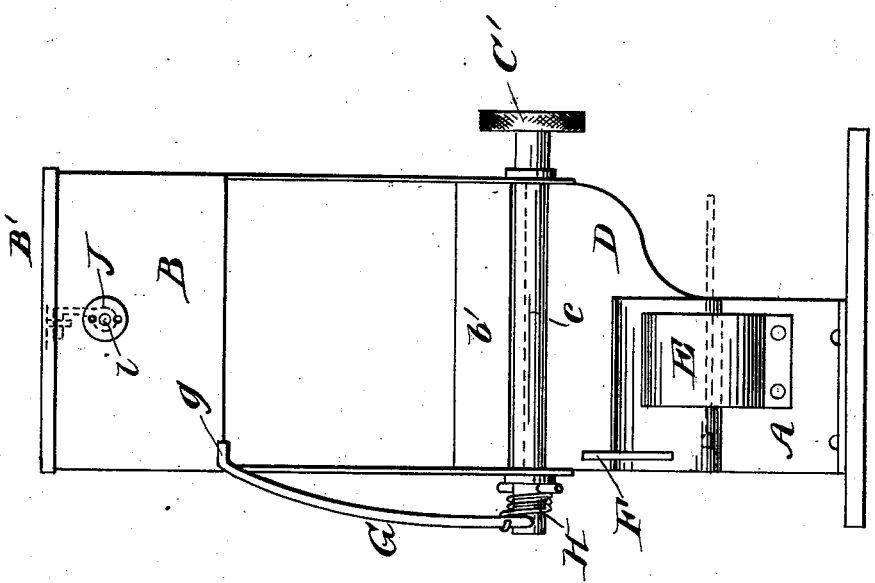
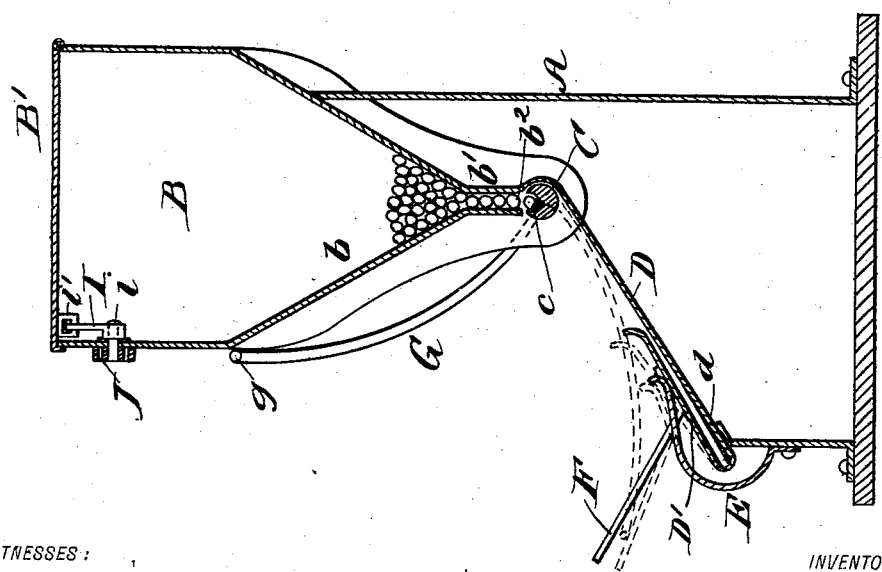
WITNESSES:
INVENTOR  
G. W. Housel.  
BY  
ATTORNEY
THE NORRIS PETERS CO., PHOTO-LITHO., WASHINGTON, D. C.

UNITED STATES PATENT OFFICE.

GEORGE WESLEY HOUSEL, OF BLOOMSBURY, NEW JERSEY.

MATCH-BOX.

SPECIFICATION forming part of Letters Patent No. 606,839, dated July 5, 1898.

Application filed August 23, 1897. Serial No. 649,096. (No model.)

*To all whom it may concern:*

Be it known that I, GEORGE WESLEY HOUSEL, a citizen of the United States, and a resident of Bloomsbury, county of Hunterdon, and State of New Jersey, have invented certain new and useful Improvements in Match-Boxes, of which the following is a specification, reference being had to the accompanying drawings, forming a part thereof, in which similar letters of reference indicate corresponding parts.

This invention relates to that class of match-boxes which embody a mechanism for effecting the automatic emission of the match; and it has for its object to provide a simple and improved match-box of this character which will possess advantages in point of convenience, safety, ease of operation, effectiveness, and general efficiency.

In the drawings, Figure 1 is a side elevation of an automatic match-box embodying my improvements. Fig. 2 is a vertical longitudinal sectional view of the same.

Referring to the drawings, A designates a suitable supporting-frame, which carries, in properly-mounted position, a reservoir or hopper B, having a transversely-convergent bottom $b$, leading to a transverse bottom neck $b'$, having an open mouth or bottom edge $b^2$.

At the bottom of the hopper, just under the mouth $b^2$, is transversely mounted a rock-shaft C, which preferably has its bearings in the sides of the hopper. This rock-shaft is provided with a longitudinal groove or recess $c$, adapted to receive a match as the latter drops from the bottom of the hopper, as shown in Fig. 2. The rock-shaft may be operated by a milled head or handle C' at one end.

D designates a forwardly and downwardly inclined apron or guide, extending from the bottom of the hopper at the rock-shaft and provided at its front lower end with an upwardly-projecting spring-plate, as at D'. The plate D' is preferably formed by a continuation of the metallic apron D, the end of the latter being bent into approximately U shape, as shown in Fig. 2. The inner ends of the U-shaped spring end are roughened, as shown at $d$.

E designates a clamping-spring, which is secured to the front portion of the frame A and has its free end projecting up and over and bearing against the spring-plate D' to normally compress the latter with the base-plate or apron D.

Upon the spring-plate D' is provided an outwardly-projecting arm F, adapted to be engaged by the end $g$ of an arm G, relatively projecting from the end of the rock-shaft and adapted when the latter is turned to bear upon the arm F and force the top spring-plate D' open with relation to the bottom plate D and against the tension of the controlling-spring E, all as shown in dotted lines, Fig. 2.

Upon the end of the rock-shaft is preferably mounted a coiled spring H, against the tension of which the rock-shaft turns and by means of which the shaft is automatically returned to normal position.

The hopper is preferably provided with a top B', which may be secured in position by means of an interior hook I, secured upon the shaft $i$ of a disk J, exteriorly mounted upon the side wall of the hopper and adapted to be operated by any suitable engaging tool to carry the interior locking hook or eye into engagement with a loop or catch $i'$ upon the top or cover B'.

It will be noted that the shaft C is cylindrical in contour and that the arrangement of the mechanism is such that its longitudinal groove or recess is normally at the top of the shaft.

In the operation of my improved safety match-box when the rock-shaft is turned forwardly it carries the match contained in its top groove or recess with it and at the same time locks the mouth $b^2$ against the passage of the other matches. The match is then dropped upon the inclined apron or guide D and slides down the same until it reaches the U-shaped spring portion, by which time the arm of the rock-shaft has engaged the arm upon the top plate of the U-shaped spring portion and operated the latter so that it is raised and permits the match to drop farther down between the plates D' and D. When the rock-shaft is returned to normal position, another match drops within its top groove or recess and the top spring-plate D' is actuated by its controlling-spring E to bear with relation to the plate D and clamp the released match within the spring U-shaped portion, so that when the match is withdrawn transversely therefrom it will be automatically ignited between the roughened walls or surfaces of said spring portion.

Having thus described my invention, what I claim as new, and desire to secure by Letters Patent, is—

1. An improved safety match-box, comprising the hopper or reservoir, the transverse rock-shaft mounted with relation to the bottom opening of the same and having the groove or recess and a projecting arm, an inclined apron or guide extending from said rock-shaft, spring ignition mechanism arranged at the bottom of said guide and provided with a projecting operating-arm adapted to be engaged by the arm upon the rock-shaft, substantially as and for the purpose set forth.

2. An improved safety match-box, comprising the hopper or reservoir, a transverse rock-shaft mounted with relation to the outlet-opening at the bottom of the latter and provided with the groove or recess and with the projecting arm, an inclined apron or guide extending from said rock-shaft, and the spring-plate arranged at the bottom end of the guide proper and bearing with relation thereto and provided with the projecting arm adapted to be engaged with the arm upon the rock-shaft, substantially as and for the purpose set forth.

3. An improved safety match-box, comprising the hopper or reservoir having the transversely-convergent bottom leading to the transverse bottom throat-opening, the transverse rock-shaft mounted below said opening and provided with the groove or recess registering therewith, and with the projecting arm, a spring controlling the operation of said rock-shaft to normal position, the inclined apron or guide extending from said rock-shaft and provided with the approximately U-shaped spring ignition end having the projecting arm at the top, and a spring bearing upon said ignition end, substantially as and for the purpose set forth.

In testimony that I claim the foregoing as my invention I have signed my name, in presence of two witnesses, this 17th day of August, 1897.

GEORGE WESLEY HOUSEL.

Witnesses:
MILLIE B. SANDS,
JOHN HANCE, Sr.